United States Patent
Matsudaira et al.

(10) Patent No.: US 9,350,422 B2
(45) Date of Patent: May 24, 2016

(54) COMMUNICATION SYSTEM, COMMUNICATION SLAVE AND COMMUNICATION MASTER

(71) Applicant: DENSO CORPORATION, Kariya, Aichi-pref. (JP)

(72) Inventors: Nobuaki Matsudaira, Kariya (JP); Shigeki Ohtsuka, Kariya (JP); Hironobu Akita, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/607,200

(22) Filed: Jan. 28, 2015

(65) Prior Publication Data

US 2015/0244420 A1    Aug. 27, 2015

(30) Foreign Application Priority Data

Feb. 27, 2014    (JP) .................................. 2014-36681

(51) Int. Cl.
| | |
|---|---|
| *H04B 3/00* | (2006.01) |
| *H04B 3/54* | (2006.01) |
| *H04L 29/08* | (2006.01) |
| *H04B 1/10* | (2006.01) |

(52) U.S. Cl.
CPC .. *H04B 3/54* (2013.01); *H04B 1/10* (2013.01); *H04L 67/1051* (2013.01)

(58) Field of Classification Search
CPC ......... H04B 3/54; H04B 1/10; H04L 67/1051
See application file for complete search history.

(56) References Cited

U.S. PATENT DOCUMENTS

| | | | | |
|---|---|---|---|---|
| 6,188,196 B1 * | 2/2001 | Koide | ................... | B60L 11/123 318/432 |
| 2006/0063494 A1 * | 3/2006 | Zhang | ....................... | H04B 1/18 455/78 |
| 2009/0143010 A1 * | 6/2009 | Fukuda | ..................... | H04B 3/54 455/41.1 |
| 2012/0177133 A1 * | 7/2012 | Oldenkamp | .............. | H04B 3/54 375/257 |
| 2013/0034137 A1 * | 2/2013 | Zuckerman | ......... | H04L 25/0278 375/222 |
| 2013/0282941 A1 * | 10/2013 | van Dijk | ............... | H04L 12/403 710/110 |
| 2014/0025999 A1 * | 1/2014 | Kessler | ............... | G06F 11/0754 714/43 |

OTHER PUBLICATIONS

Markus Romer. "APIX Industrial—Standard connectivity for industrial display applications", White Paper, Inova Semiconductors, Oct. 2009, Version 1.0 (discussed on p. 1 of the specification).

* cited by examiner

*Primary Examiner* — Syed Haider
(74) *Attorney, Agent, or Firm* — Posz Law Group, PLC

(57) ABSTRACT

A communication system includes multiple communication nodes and a communication line. The multiple communication nodes include a master and multiple slaves. The communication line cascade-connects the communication nodes and supplies electricity. The communication line corresponds to a feeder line. Each of the communication nodes is connected with the communication line through an inductor to be supplied with electricity. The each of the communication nodes is AC coupled to the communication line to transmit and receive a communication signal. The master and the slaves perform a bidirectional communication. A communication slave is provided. The communication slave is connected with a communication line through an inductor to be supplied with electricity. A communication master is provided.

9 Claims, 10 Drawing Sheets

COMMUNICATION SYSTEM, COMMUNICATION SLAVE AND COMMUNICATION MASTER

CROSS REFERENCE TO RELATED APPLICATION

This application is based on Japanese Patent Application No. 2014-36681 filed on Feb. 27, 2014, the disclosure of which is incorporated herein by reference.

TECHNICAL FIELD

The present disclosure relates to a communication system in which communication nodes including a master and multiple slaves form a cascade connection through a communication line also used as a feeder line, and relates to a communication slave and a communication master used in the communication system.

BACKGROUND

Non-patent literature 1: APIX Industrial Standard connectivity for industrial applications, White Paper, October 2009, Version 1.0, By Markus Römer, Inova Semiconductors, GmbH In a vehicular apparatus, a reduction of the number of cables connecting an ECU (electronic control unit) with a sensor or an actuator may lead to a reduction of a fuel consumption of a vehicle or may reduce cost. PLC (power line communication) transmitting communication through a power wire may be well known to reduce the number of cables.

As an example of PLC, Power over APIX disclosed in non-patent literature 1 is known. The Power over APIX communicates one on one between a transmitter and a receiver. The Power over APIX cuts DC components in the power wire by an AC coupling to receive a communication signal, and cuts the communication signal with an inductor to obtain power. Thus, the Power over APIX enables to perform communication so that a power source and the communication signal are prevented from affecting each other.

The inventors of the present disclosure have found the following.

In a vehicular apparatus, one ECU corresponding to a master may control multiple slaves such as a sensor, an actuator, or the like generally. In this case, when the Power over APIX is used in the above control mode, one ECU and multiple slaves are separately connected so that a wiring may be redundant and many communication ports should be prepared in the ECU.

SUMMARY

It is an object of the present disclosure to provide a communication system, a communication slave, and a communication master, which simplify a connection mode of a master and multiple slaves and introduce power line communication.

According to one aspect of the present disclosure, a communication system includes multiple communication nodes and a communication line is provided. The communication nodes include a master and multiple slaves. The communication line cascade-connects the communication nodes and supplies electricity. The communication line corresponds to a feeder line. Each of the communication nodes is connected with the communication line through an inductor to be supplied with electricity. The each of the communication nodes is AC coupled to the communication line to transmit and receive a communication signal. The master and the slaves perform a bidirectional communication.

According to another aspect of the present disclosure, a communication slave is provided. The communication slave is connected with a communication line through an inductor to be supplied with electricity. The communication slave is AC coupled to the communication line to receive a communication signal transmitted from a master. The communication slave transmits the communication signal to the master through the communication line.

According to another aspect of the present disclosure, a communication master is provided. A power source is connected with a communication line through an inductor and supplies a slave with electricity. The communication master is AC coupled to the communication line to transmit and receive a communication signal with the slave. The communication master includes a receiver receiving a signal transmitted from the slave. The communication master includes a signal distortion correction circuit at an input side of the receiver. The signal distortion correction circuit detects an amount of distortion of a signal waveform generated by a magnetic saturation phenomenon in the communication line. The signal distortion correction circuit corrects the distortion of the signal waveform according to the amount of the distortion.

According to the present disclosure, communication nodes including the master and multiple slaves are cascade connected through the communication line, which is also used as the feeder line. Each of the slaves is supplied with electricity by connecting to the communication line through the inductor. Each of the slaves is AC coupled to the communication line to receive and transmit a communication signal. The master and multiple slaves enable to perform a bidirectional communication. Therefore, it may be possible to simplify a wiring connection between the master and multiple slaves and to introduce power line communication.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
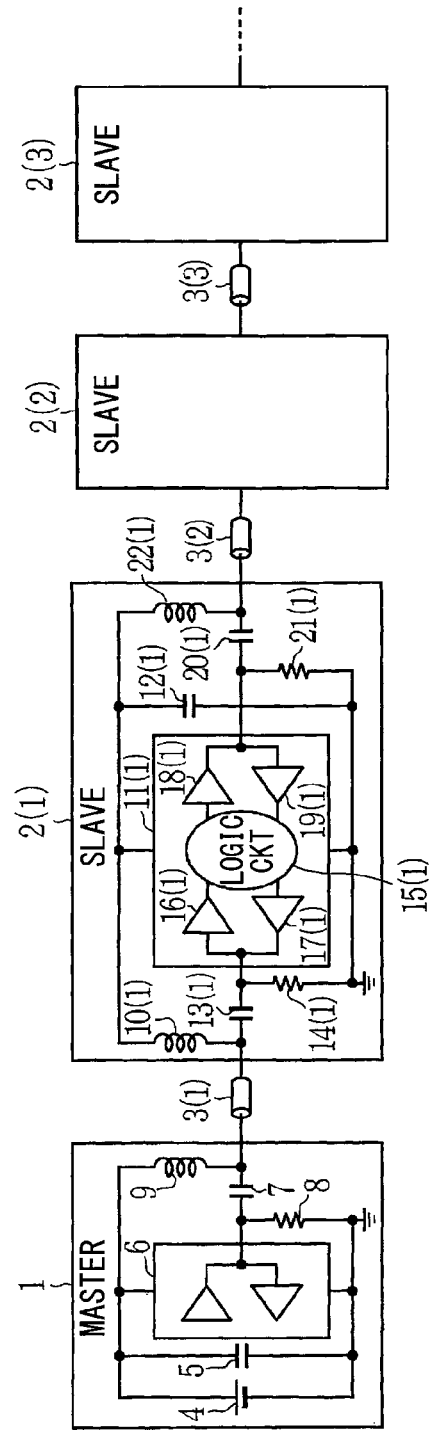
FIG. 1 is a diagram illustrating a configuration of a communication system in a first embodiment.

As described in FIG. 1, a communication system in the present embodiment includes a master 1 and multiple slaves 2 (1, 2, 3, etc.). The master 1 and the multiple slaves 2 correspond to communication nodes. In the communication system, the master 1 and the multiple slaves 2 (1, 2, 3, etc.) are cascade connected through a communication line 3, which is a single end type communication line. The master 1 includes a direct current (DC) power source 4. The DC power source 4 is connected to a decoupling capacitor 5 and a transceiver 6 in parallel. Thus, the transceiver 6 is supplied with power from the DC power source 4 to operate.

An input-output terminal of the transceiver 6 is connected with a communication line 3 (1) through a coupling capacitor 7, and is also connected to the ground through a termination resistor 8. A positive terminal of the DC power source 4 is connected to one terminal of the communication line 3 (1) through an inductor 9. The communication line 3 (1) is also used as a feeder line to a slave 2.

The other terminal of the communication line 3 (1) is connected to a power source terminal of a communication circuit 11 (1), which corresponds to a main body of the slave 2 (1), through the inductor 10 (1). A decoupling capacitor 12 (1) is connected between the power source terminal and the ground. The communication circuit 11 (1) is supplied with operation power through the communication line 3 (1). In addition, the other terminal of the communication line 3 (1) is connected to a master-side input-output terminal of the communication circuit 11 (1) through the coupling capacitor 13 (1). The master-side input-output terminal is connected to the ground through the termination resistor 14 (1).

The communication circuit 11 (1) includes a logic circuit 15 (1), a master-side receiver 16 (1), a master-side transmitter 17 (1), a slave-side transmitter 18 (1), and a slave-side receiver 19 (1). The master-side receiver 16 (1) corresponds to a receiver, and the master-side transmitter 17 (1) corresponds to a driver. A DC component (corresponding to power source) of a signal (corresponding to a signal having a communication rate of several MHz to several GHz, for example) transmitted from the master 1 is cut by the coupling capacitor 13 (1) and the signal is input to the master-side receiver 16 (1), so that the signal is input to the logic circuit 15 (1) through the master-side receiver 16 (1). A signal that the logic circuit 15 (1) transmits to the master 1 is output to the communication line 3 (1) through the master-side transmitter 17 (1) and the coupling capacitor 13 (1).

A signal that the logic circuit 15 (1) transmits to the downstream slave 2 (2) is output to the communication line 3 (2) through the slave-side transmitter 18 (1) and the coupling capacitor 20 (1). A signal transmitted from the slave 2 (2) to the slave 2 (1) is input to the slave-side receiver 19 (1) through the communication line 3 (2) and the coupling capacitor 20 (1), and is input to the logic circuit 15 (1) through the slave-side receiver 19 (1). A slave-side input-output terminal of the communication circuit 11 (1) is connected to the ground through a termination resistor 21 (1). A power source terminal of the communication circuit 11 (1) is connected to the communication line 3 (2) through an inductor 22 (1). Other slaves 2 (2), 2 (3) or the like have a similar configuration with the slave 2 (1).

A power of the DC power source 4 in the master 1 is supplied to the communication line 3 (1) through the inductor 9, and in the slave 2 (1), the power is supplied to the communication circuit 11 (1) through the inductor 10 (1). The master 1 includes a communication controller configured from a microcomputer (not shown). A signal that the master 1 transmits to the slave 2 (1) is supplied to the communication line 3 (1) through the coupling capacitor 7, and is supplied to the communication circuit 11 (1) through the coupling capacitor 13 (1) in the slave 2 (1).

The communication signal is superposed on power source to be transmitted in the communication line 3 (1), and the inductor 10 (1) cuts a signal component so that only the power is supplied to the power source terminal of the communication circuit 11 (1) in the slave 2 (1). In addition, the coupling capacitor 13 (1) cuts the power source (e.g. a DC component) supplied from the communication line 3 (1), so that only the communication signal is input to the communication circuit 11 (1).

Incidentally, the master 1 separately designates a destination address of the slaves 2 (1, 2, 3, etc.) in the communication signal to transmit the communication signal. The logic circuit 15 in a slave 2 returns a response to the master 1 according to a command included in the communication signal when the destination address included in the received signal designates the slave 2 itself. For example, the logic circuit 15 may be connected with a sensor such as an acceleration sensor or the like (not shown), and the logic circuit 15 returns to the master 1 information representing whether an output signal from the sensor exists. When the destination address does not designate the slave 2 itself, the slave 2 just transmits the received signal to a downstream slave 2 through the slave-side transmitter 18 of the slave 2.

The logic circuit 15 just transmits a signal to the upstream side (e.g. the slave 2 or the master 1) through the master-side transmitter 17 (1) when the logic circuit 15 receives a signal transmitted from the slave 2 positioned to the downstream through the slave-side receiver 19 (1).

According to the present disclosure, communication nodes including the master 1 and multiple slaves 2 are cascade connected through the communication line 3, which is also used as the feeder line. Each of the slaves 2 is supplied with electricity by connecting to the communication line 3 through the inductor 10. Each of the slaves 2 is AC coupled to the communication line 3 with the coupling capacitor 13 to receive and transmit a communication signal. The master 1 and multiple slaves 2 enable to perform a bidirectional communication. Therefore, it may be possible to simplify a wiring connection between the master 1 and multiple slaves 2 and to introduce power line communication.

Second Embodiment

Figure 2:
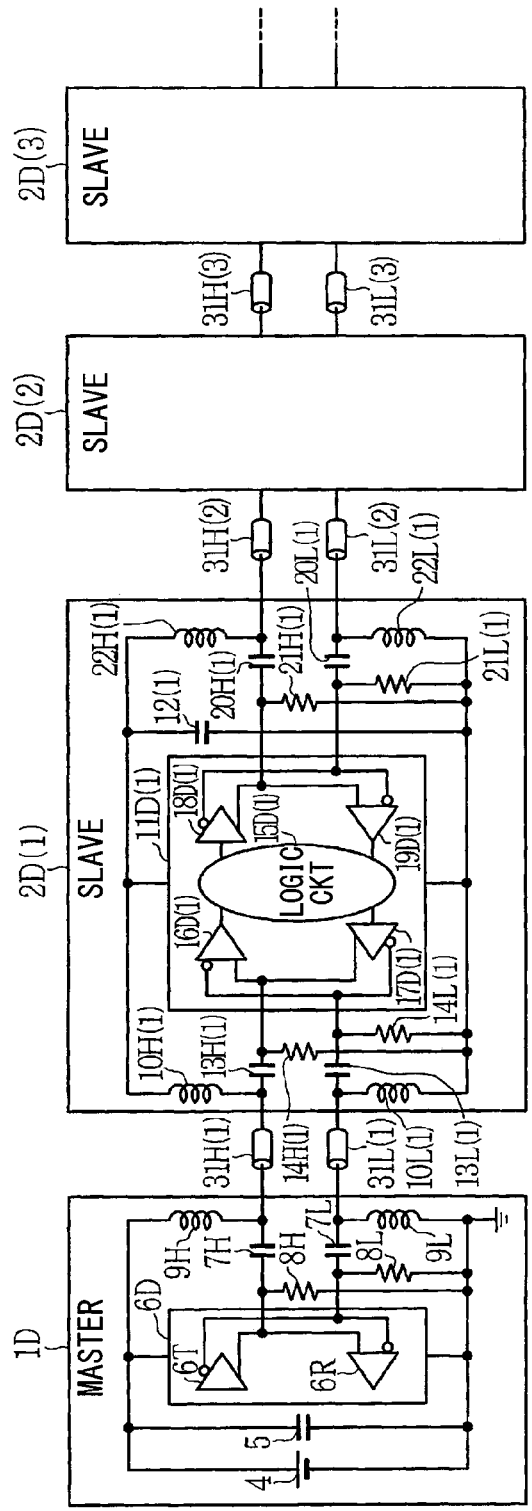
FIG. 2 is a diagram illustrating a configuration of a communication system in a second embodiment.

Followingly, the parts identical with the first embodiment will be given to the identical symbols and a different part will be explained mainly. As described in FIG. 2, a communication system in a second embodiment uses a differential type communication line, which is different from the single end type communication line in the first embodiment. In addition, a configuration of a master and a slave has a configuration corresponding to a transmission of a differential signal.

That is, a master 1D includes a transceiver 6D with a transmitter 6T that transmits a differential signal and a receiver 6R that receives the differential signal. A input-output terminal of the transceiver 6D is connected to communication lines 31H (1), 31L (1) through coupling capacitors 7H, 7L. The input-output terminal is connected to the ground through termination resistors 8H, 8L. A positive terminal of the DC power source 4 is connected to the communication line 31H (1) through an inductor 9H, and a negative terminal of the DC power source 4 is connected to the communication line 31L (1) through an inductor 9L.

A slave 2D (1) includes a communication circuit 11D (1) that transmits and receives the differential signal. A master-side input-output terminal of the communication circuit 11D (1) is connected to the communication lines 31H (1), 31L (1) through coupling capacitors 13H (1), 13L (1). The communication line 31H (1) is connected to the ground terminal a power source terminal of the communication circuit 11D (1) through the inductor 10H (1), and the communication line 31L (1) is connected to a ground terminal of the communication circuit 11D (1) through the inductor 10L (1).

A slave-side input-output terminal of the communication circuit 11D (1) is connected to the communication lines 31H (2), 31L (2) through coupling capacitors 20H (1), 20L (1). The input-output terminal is connected to the ground through termination resistors 21H (1), 21L (1). A power source terminal of the communication circuit 11D (1) is connected to the communication line 31H (2) through an inductor 22H (1), and a ground terminal of the communication circuit 11D (1) is connected to the communication line 31L (2) through an inductor 22L (1). Incidentally, a configuration of other slaves 2D (2), 2D (3) or the like is the same with the slave 2D (1).

When a voltage of the DC power source 4 is equal to 5 V and the transceiver 6D does not transmit a differential signal, a potential of the communication line 31H (1) is equal to 5 V and a potential of the communication line 31L (1) is equal to 0 V. The transceiver 6D drives the communication line 31H (1) to vary the potential of the communication line 31H (1) from, for example, 4.5 V to 5.5 V having 5 V as a center voltage. The transceiver 6D drives the communication line 31L (1) to vary the potential of the communication line 31L (1) from, for example, −0.5 V to 0.5 V having 0 V as a center voltage. Accordingly, the differential voltage of the differential signal that received by the communication circuit 11D (1) is varied between −1.0 V and 1.0 V, and a binary signal is transmitted.

According to the second embodiment, the master 1D and the multiple slaves 2D are cascade connected through the communication lines 31H, 31L, which transmit the differential signal. By applying the present disclosure to a communication system transmitting the differential signal, it may be possible to obtain the effects similar to the first embodiment.

Third Embodiment

Figure 3:
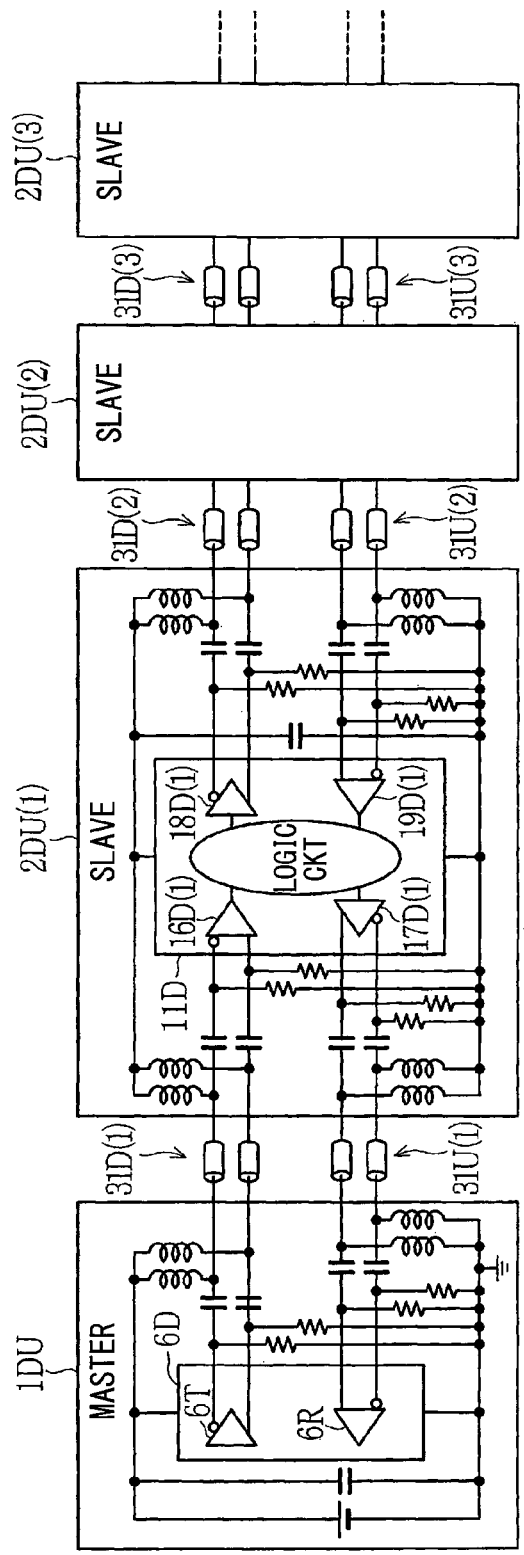
FIG. 3 is a diagram illustrating a configuration of a communication system in a third embodiment.

In the second embodiment, the master 10 and multiple slaves 2D perform the bidirectional communication through the communication lines 31H, 31L. In a third embodiment, as described in FIG. 3, two pairs of communication lines transmitting the differential signal are provided, and a unidirectional communication is performed in each communication line. A master and slaves have configurations corresponding to the transmission mode.

A transceiver 6D in a master 1DU is a configuration similar to the transceiver 6D in the second embodiment and includes a transmitter 6T and a receiver 6R. A differential output terminal of the transmitter 6T is connected to a communication line 31D (1) and transmits a signal to a slave 2DU. A differential input terminal of the receiver 6R is connected to a communication line 31U (1) and receives a signal transmitted from the slave 2DU.

A slave 2DU (1) has a communication circuit 11D (1), which has a configuration similar to the communication circuit 11D (1) in the second embodiment, and a differential input terminal of a master-side receiver 16D (1) is connected to the communication line 31D (1). A differential output terminal of a master-side transmitter 17D (1) is connected to the communication line 31U (1). A differential output terminal of a slave-side transmitter 18D (1) is connected to a communication line 31D (2), and a differential input terminal of a slave-side receiver 19D (1) is connected to the communication line 31U (2).

Incidentally, the communication line 31U has a symmetrical configuration with the communication line 31D and is connected to inductors 10, 22, coupling capacitors 13, 20, termination resistors 14, 21, or the like as described in second embodiment. The symbols of the above elements will be omitted for simplification of the drawing.

According to the third embodiment, the master 1DU uses the communication line 3 (1) to transmit the differential signal when the master 1 DU transmits the differential signal to the slave 2DU. The slave 2DU uses the communication line 31U (1) to transmit the differential signal when the slave 2DU transmits the differential signal to the master 1DU. Therefore, in a communication system in which a unidirectional communication is performed by two pairs of the differential communication lines 31D, 31U, effects similar to the first embodiment and the second embodiment may be obtained.

Fourth Embodiment

Figure 4:
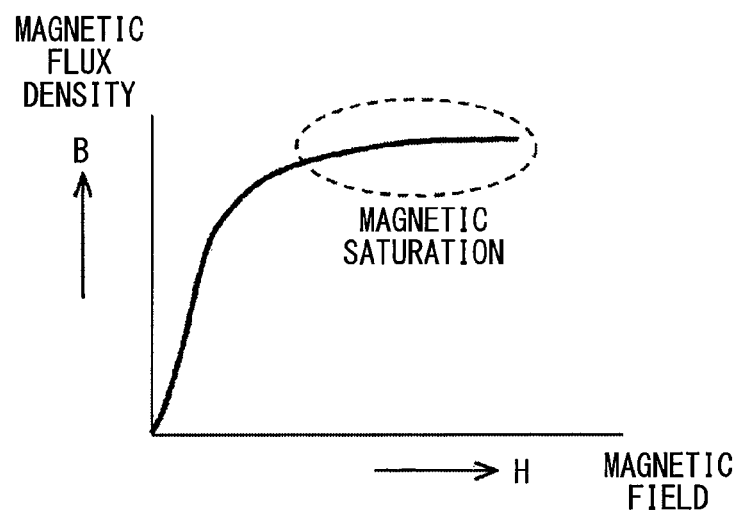
FIG. 4 is a diagram explaining a magnetic saturation in a fourth embodiment.
Figure 5:
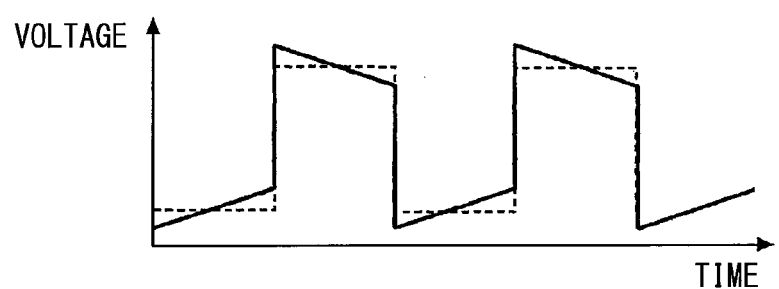
FIG. 5 is a diagram illustrating a distortion generated in a communication signal waveform by a magnetic saturation.

A distortion of a signal waveform that may occur when the communication system in the above embodiment is provided will be explained. When the amount of current flowing in the communication line 3 increases, a magnetic saturation phenomenon may occur (referring to FIG. 4). In the magnetic saturation phenomenon, a magnetic flux density is not varied even when a magnetic field increases in the inductor 10 or the like. A self-inductance is reduced and a distortion of a signal waveform occurs (referring to FIG. 5). In FIG. 5, a solid line represents a case when a magnetic saturation occurs, and a dashed line represents a case when a magnetic saturation does not occur. The distortion may cause a communication error.

Figure 6:
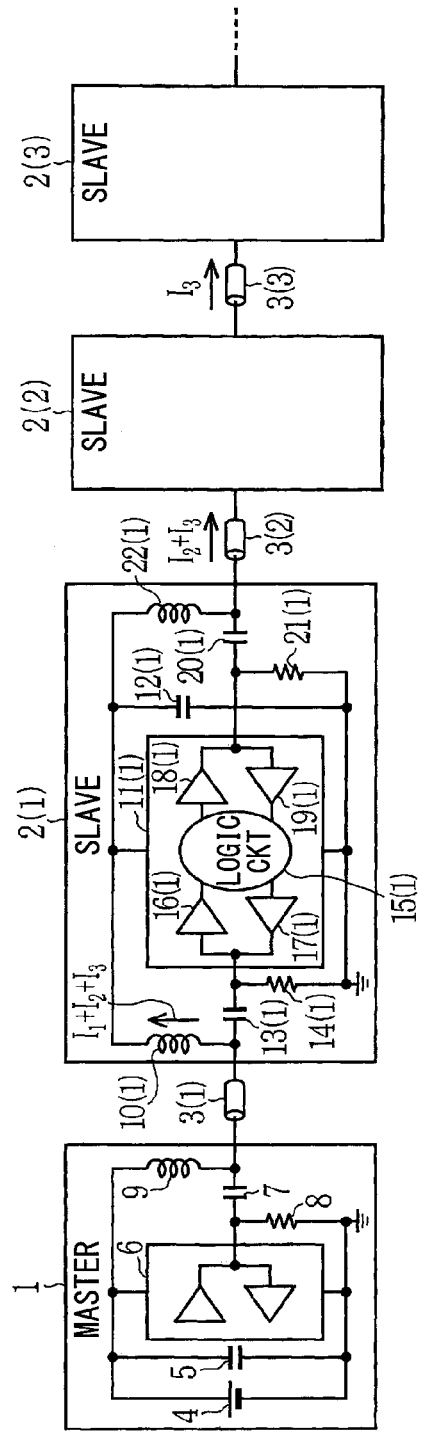
FIG. 6 is a diagram illustrating a variation of the amount of current flowing in each slave through a communication line.
Figure 7:
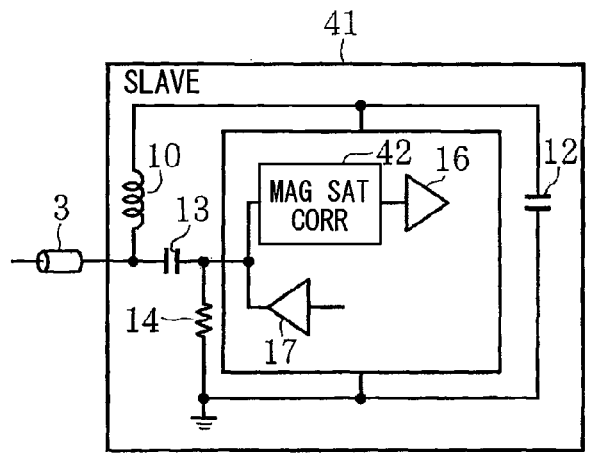
FIG. 7 is a functional block diagram illustrating a configuration of a slave.

When each communication node is cascade connected like the above embodiment, the current following in an inductor 10 of a slave 2 becomes much as close to the master 1 as an inductor 10 is (referring to FIG. 6). The magnetic saturation may occur. In FIG. 6, a current illustrated by I1+I2+I3 flows in the inductor 10 (1), a current illustrated by I2+I3 flows in the communication line 3 (2), and a current illustrated by 13 flows in the communication line 3 (3). In the fourth embodiment, as described in FIG. 7, a magnetic saturation correction circuit 42 is inserted into an input side of a master-side receiver 16 in the slave 41 and corrects the distortion of the signal waveform. Incidentally, the master-side receiver 16 may be unnecessary in some cases. A magnetic saturation correction circuit in the present embodiment corresponds to a signal distortion correction circuit.

The magnetic saturation phenomenon may occur when a slave 41 receives a signal transmitted from another slave 41 or when the master 1 receives a signal transmitted from a slave 41. Therefore, in actual, the magnetic saturation correction circuit 42 may be also disposed to an input side of the slave-side receiver 19 and an input side of the receiver 6R of the master 1. Incidentally, for simplify an explanation, only the magnetic saturation correction circuit 42 of the input side of the master-side receiver 16 is illustrated and will be explained. It should be noted that the fifth and subsequent embodiments is described similarly.

Figure 8:
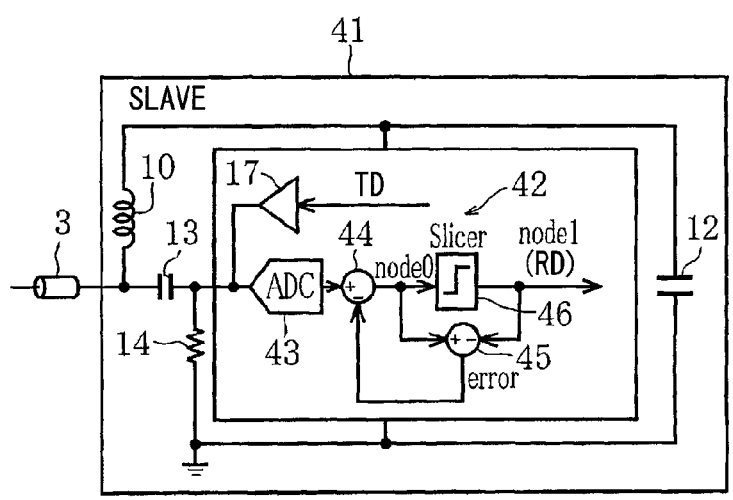
FIG. 8 is a functional block diagram illustrating a configuration of a magnetic saturation circuit.

As described in FIG. 8, the magnetic saturation correction circuit 42 includes an A/D converter 43, subtractors 44, 45, and a slicer 46. The A/D converter 43 may also referred to as an ADC, the subtractor 44 may also referred to as a correction circuit, and the slicer may also referred to as a comparator. The A/D converter 43 may have 8 bits, for example. The A/D converter 43 performs A/D conversion and inputs data to the slicer 46 through the subtractor 44. The slicer 46 compares data with an intermediate value "127" as a threshold value. The intermediate value "127" corresponds to an intermediate of the A/D converter 43. When the input data exceeds the threshold, the slicer 46 outputs a data value of 255, which is a maximum data value of 8 bits. When the input data does not exceed the threshold, the slicer 46 outputs a data value of zero. That is, the slicer 46 corresponds to a digital comparator.

The subtractor 45 subtracts an output data (node1) from the input data (node0) of the slicer 46 and outputs a subtraction result (error) to the subtractor 44. The subtractor 44 subtracts the subtraction result (error) from the output data of the A/D converter 43 and output to the slicer 46.

Figure 9:
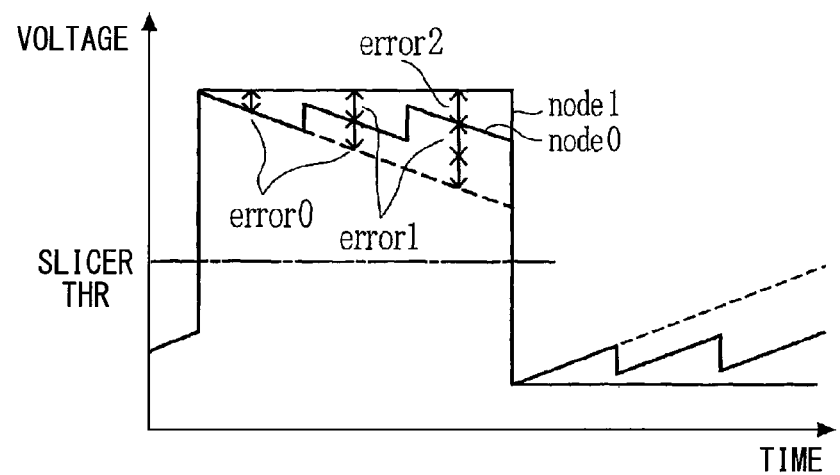
FIG. 9 is a diagram illustrating a signal waveform illustrating an effect of a magnetic saturation circuit.

As described in FIG. 9, when a distortion occurs in a signal waveform that the slave 41 has received from a master by a magnetic saturation, signal amplitude (or a signal level) decreases gradually in a case when a high level signal continues. In a case when a low level signal continues, signal amplitude (or the signal level) increases gradually as illustrated by a dashed line in FIG. 9. Data output by the slicer 46 is equal to values (255 or zero, which is a binary data) corresponding to a high level signal (255) and a low level signal unless the A/D conversion data varies and crosses the threshold value.

When the distortion occurs in the signal waveform by the magnetic saturation, the A/D conversion data is less than an output data from the slicer 46 at a time when a reception signal corresponds to the high level signal. The subtraction result (error) of the subtractor 45 has a negative value, so that a result of the subtraction by the subtractor 44 corresponds to an addition of an absolute value of the subtraction result (error). Therefore, while the reception signal represents the high level signal, differences (e.g., error0, error1, error2, or the like) between the output data of the slicer 46 and the A/D conversion data is added to the A/D conversion data so as to compensate a reduction of the A/D conversion data.

At a time when the reception signal corresponds to the low level signal, the A/D conversion data is more than the output data of the slicer 46. The subtraction result (error) of the subtractor 45 has a positive value, so that the subtractor 44 just subtracts the subtraction result (error) from the A/D conversion data. Therefore, when the reception signal represents the low level signal, a difference between the output data of the slicer 46 and the A/D conversion data is subtracted so as to prevent increase of the A/D conversion data. Incidentally, the master-side receiver 16 may become unnecessary, and a digital data output from the slicer 46 is just input to the logic circuit 15.

According to the fourth embodiment, each communication node of the master 1 and the slave 41 includes a magnetic saturation correction circuit 42 that detects the amount of distortion of the signal waveform based on the magnetic saturation phenomenon in the communication line 3 and corrects the distortion of the signal waveform according to the amount of the distortion. In the magnetic saturation correction circuit 42, the A/D converter 43 performs an A/D conversion of the reception signal. The slicer 46 outputs a binary data according to a result of comparison between the data after the A/D conversion and a threshold data. The subtractor 45 calculates a difference between the input data and the output data of the slicer 46. The subtractor 44 corrects the output data of the A/D converter 43 according to a data value of the difference. Therefore, according to the amount of the distortion of the signal waveform at a time when a communication is actually performed, it may be possible to correct the signal waveform dynamically so as to reduce the distortion and to avoid an occurrence of a communication error.

Fifth Embodiment

Figure 10:
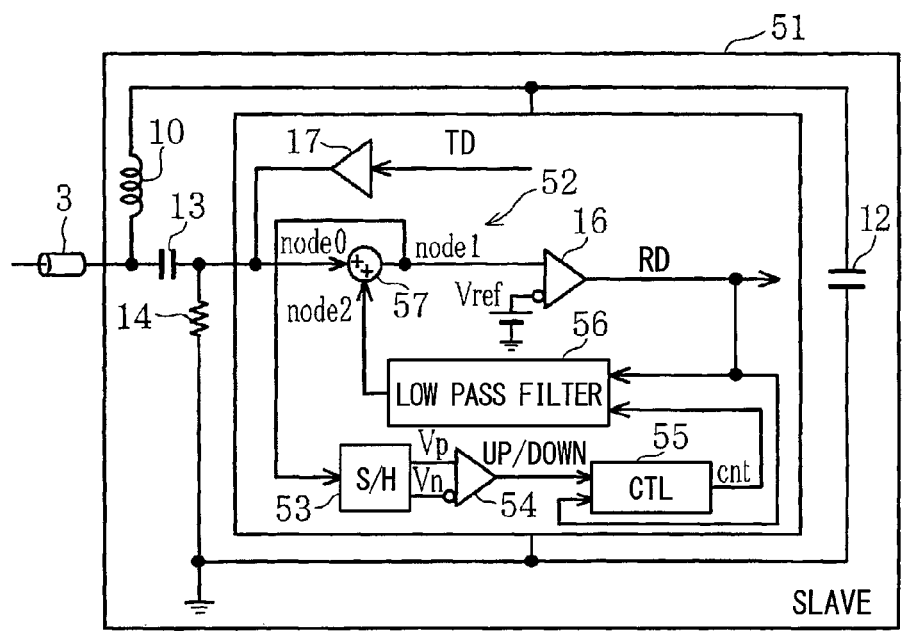
FIG. 10 is a functional block diagram illustrating a configuration of a communication system in a fifth embodiment.

As described in FIG. 10, a slave 51 in a fifth embodiment includes a magnetic saturation correction circuit 52 different from the magnetic saturation correction circuit 42 in the fourth embodiment. The magnetic saturation correction circuit 52 includes a sample hold circuit 53, a comparator 54, a control circuit 55, a time constant variation low pass filter 56, and an adder 57. The sample hold circuit 53 may also be illustrated by S/H and may also be referred to as an increase-and-decrease determination portion. The comparator 54 may also be referred to as the increase-and-decrease determination portion. The control circuit 55 may also be referred to as an adjustment signal output portion. The time constant variation low pass filter 56 may also be referred to as a LPF. The master-side receiver 16 receives the reception signal through the adder 57.

Figure 11:
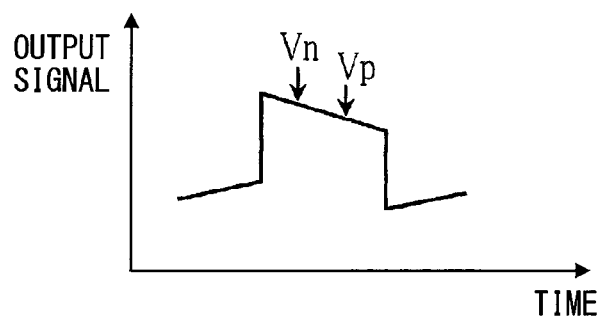
FIG. 11 is a diagram illustrating timing when a sample hold circuit samples a signal level.

The sample hold circuit 53 samples levels of the output signal of the adder 57 at least twice (corresponding to Vn and Vp in FIG. 11) during one bit period of the communication signal, and keeps sample values. Incidentally, a sampling cycle is set to satisfy the above condition. The comparator 54 compares the two levels Vn, Vp, which are held by the sample hold circuit 53. When Vn<Vp, the comparator 54 outputs a high level signal (up) to the control circuit 55. When Vn>Vp, the comparator 54 output a low level signal (down) to the control circuit 55. The control circuit 55 outputs a control signal (cnt) to the LPF 56 according to a reception data, which is input from the master-side receiver 16, and a signal input from the comparator 54. The control signal (cnt) may be an example of an adjustment signal.

The LPF 56 changes a time constant of a filter according to the control signal (cnt) and performs a low-pass filtering (integrates) of the reception data (an analog data) output from the master-side receiver 16. The adder 57 adds the output signal of the LPF 56 to the reception signal level of the slave 51 by an analog operation. Accordingly, a feedback loop is configured to correct the distortion of the signal waveform.

Figure 12:
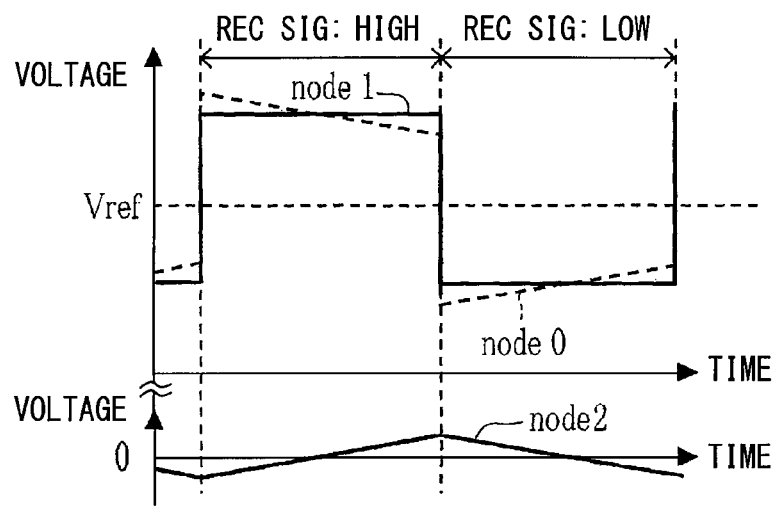
FIG. 12 is a diagram illustrating variations of voltage waveforms.

It is assumed that an input terminal of the adder 57 corresponds to a node0, an output terminal of the adder 57 corresponds to a node1, and an output terminal of the LPF 56 corresponds to a node2. When a distortion of the signal waveform occurs by a magnetic saturation and the reception signal corresponds to the high level signal, a signal level of the node1 decreases at an initial stage when a correction by a feedback does not function. In this case, Vn is more than Vp (referring to FIG. 12).

Therefore, the comparator 54 outputs the low level signal (down) and the control circuit 55 decrements the control signal (cnt). For example, when an initial value corresponds to 4 bits and represents "0011", the initial value of 0011 is changed to "0010".

The LPF 56 decreases the time constant according to a change of the control signal (cnt) and widens the pass band width. Accordingly, the output signal (node2) of the LPF 56 gradually increases, the adder 57 adds the output signal to the reception signal, so that the distortion of the signal waveform input to the master-side receiver 16 is cancelled.

When the reception signal corresponds to the low level signal, the signal level of node1 increases at the initial stage where the correction does not function. In this case, Vn is less than Vp (referring to FIG. 12). Therefore, the comparator 54 outputs the high level signal (up), and the control circuit 55 increments the control signal (cnt). The LPF 56 increases the time constant according to a change of the control signal (cnt) and narrows the pass band width. Accordingly, the output signal (node2) of the LPF 56 gradually decreases, and the adder 57 adds the output signal to the reception signal, so that the distortion of the waveform of the signal input to the master-side receiver 16 is cancelled. Therefore, a negative feedback control is performed and a slope (the distortion) of the reception signal waveform may be disappeared.

When the reception signal corresponds to the high level and the comparator 54 outputs the high level signal (up), the control circuit 55 increments the control signal (cnt) and reduces the amount of the correction since the amount of the correction by the feedback is excess.

When the sample hold circuit 53 samples the levels (Vn and Vp) of the output signal while the reception signal changes between the high level and the low level (referred to as an transition period), the case corresponds to an unrelated data with the distortion of the signal waveform by the magnetic saturation. Thus, the control circuit 55 monitors a variation of the binary level of the reception signal and ignores a signal that the comparator 54 has outputted during the transition period. Incidentally, when a sample timing of the sample hold circuit 53 is synchronously set to, for example, a clock signal that generated by a CDR (clock data recovery) from a reception data row and the sampling is performed without being across the binary levels, it may be unnecessary that the control circuit 55 monitors the reception signal.

According to the fifth embodiment, the magnetic saturation correction circuit 52 includes the LPF 56 whose time constant is changeable. The sample hold circuit 53 and the comparator 54 determine the increase and decrease state of the signal amplitude during one bit period of the reception signal. The control circuit 55 generates and outputs the control signal (cnt) that changes the time constant of the LPF 56 according to the increase and decrease state of the signal amplitude. Therefore, it may be possible to correct the distortion of the signal waveform by the magnetic saturation without the A/D converter 43 as described in the fourth embodiment.

Sixth Embodiment

Figure 13:
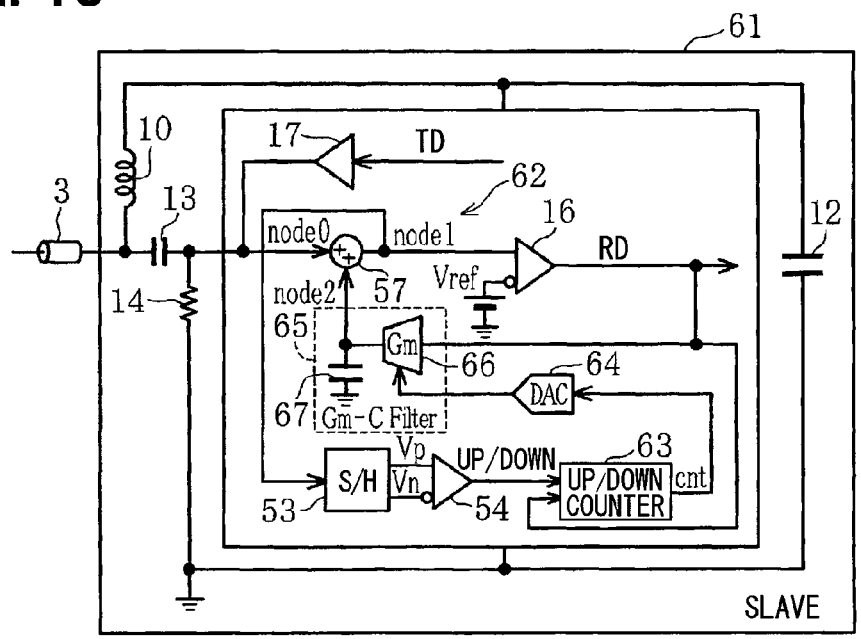
FIG. 13 is a functional block diagram illustrating a configuration of a magnetic saturation circuit in a sixth embodiment.

The sixth embodiment described in FIG. 13 illustrates a configuration of the fifth embodiment more specifically. A slave 61 includes a magnetic saturation correction circuit 62. The magnetic saturation correction circuit 62 includes an up-down counter 63 (corresponding to an adjustment signal output portion) corresponding to the control circuit 55, a D/A converter 64 (corresponding to an adjustment signal output portion), and a Gm-C filter 65 corresponding to the LPF 56. The D/A converter 64 may also be referred to as a DAC for simplification. The up-down counter 63 receives the output signal of the comparator 54 as an up-down control signal (up/down). The D/A converter 64 performs a D/A conversion to a count value (cnt) of the up-down counter 63, and an analog signal that is D/A converted is input to the Gm-C filter 65 as a time constant control signal.

The Gm-C filter 65 includes a transconductance amplifier (Gm) 66 and a capacitor 67. The transconductance amplifier 66 enables to adjust a conductance gm. The transconductance amplifier 66 may also be referred to as a resistance variation portion. The capacitor 67 has a capacitance C. The time constant is equal to 1/gm·C. The transconductance amplifier 66 changes the conductance gm according to the time constant control signal input from the D/A converter 64.

When the distortion occurs in the signal waveform by the magnetic saturation in a period when the reception signal corresponds to the high level, the comparator 54 outputs the low level signal (down) and decrements the up-down counter 63. The Gm-C filter 65 increases the conductance gm and decreases the time constant according to a decrease of a count value of the up-down counter 63. The Gm-C filter 65 widens the pass band width. When the reception signal corresponds to the low level, the comparator 54 outputs the high level signal (up) to increment the up-down counter 63. The Gm-C filter 65 reduces the conductance gm and increases the time constant according to the increase of the count value of the up-down counter 63, so that the Gm-C filter narrows the pass band width. Accordingly, the effects similar to the fifth embodiment will be realized.

According to the sixth embodiment, the up-down counter 63 performs up/down count based on a determination result of the increase and decrease state determined by the comparator 54. The D/A converter 64 performs the D/A conversion of the count value of the up-down counter 63 and outputs the time constant control signal to the Gm-C filter 65. The Gm-C filter 65 is configured from the transconductance amplifier 66 and the capacitor 67. Thus, the effects similar to the fifth embodiment will be realized.

Seventh Embodiment

Figure 14:
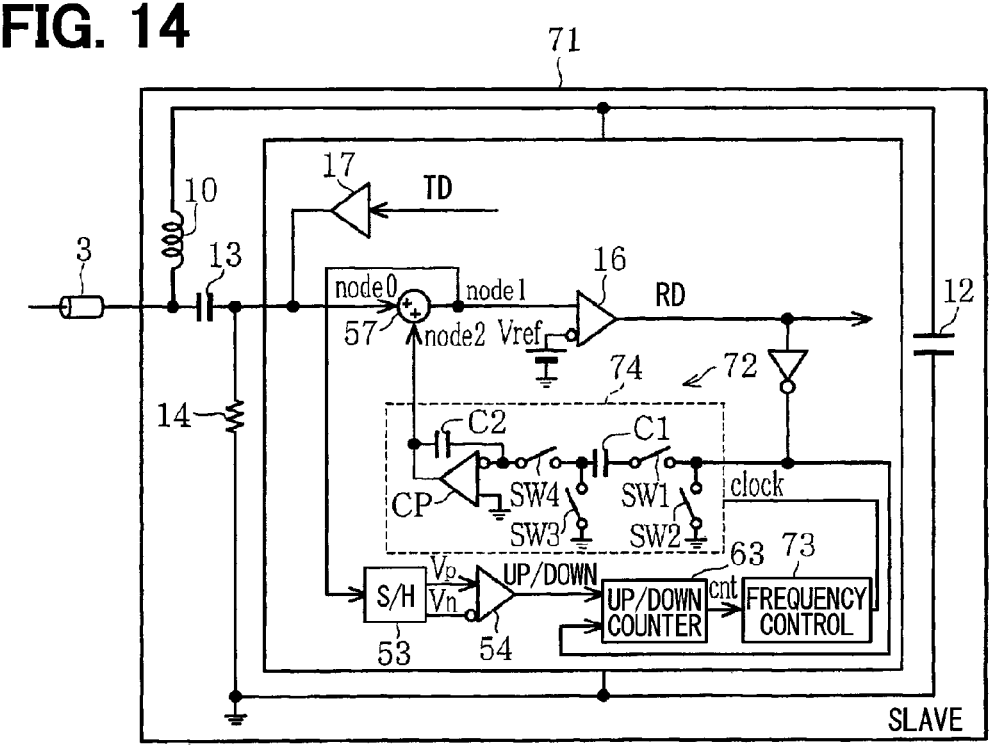
FIG. 14 is a functional block diagram illustrating a configuration of a magnetic saturation circuit in a seventh embodiment.

As described in FIG. 14, a slave 71 in the seventh embodiment includes a magnetic saturation correction circuit 72. The magnetic saturation correction circuit 72 includes a frequency control circuit 73 instead of the D/A converter 64 in the sixth embodiment and a switched capacitor filter 74 instead of the Gm-C filter 65. The frequency control circuit 73 may also be referred to as an oscillation circuit. The frequency control circuit 73 changes a frequency of the clock signal output to the switched capacitor filter 74 according to a count value of the up-down counter 63. For example, the frequency control circuit 73 may be configured from a frequency synthesizer using a PLL (phase locked loop) circuit.

The switched capacitor filter 74 includes an operational amplifier OP, capacitors C1, C2, and switches SW1, SW2, SW3, SW4. The switched capacitor filter 74 alternately turns on/off between the switch SW1 and the switch SW3 and between the switch SW2 and the switch SW4 at a frequency of the input clock signal. As the frequency increases, the time constant of the filter decreases. Therefore, the effects similar to the fifth and sixth embodiments will be realized in the seventh embodiment.

Eighth Embodiment

Figure 15:
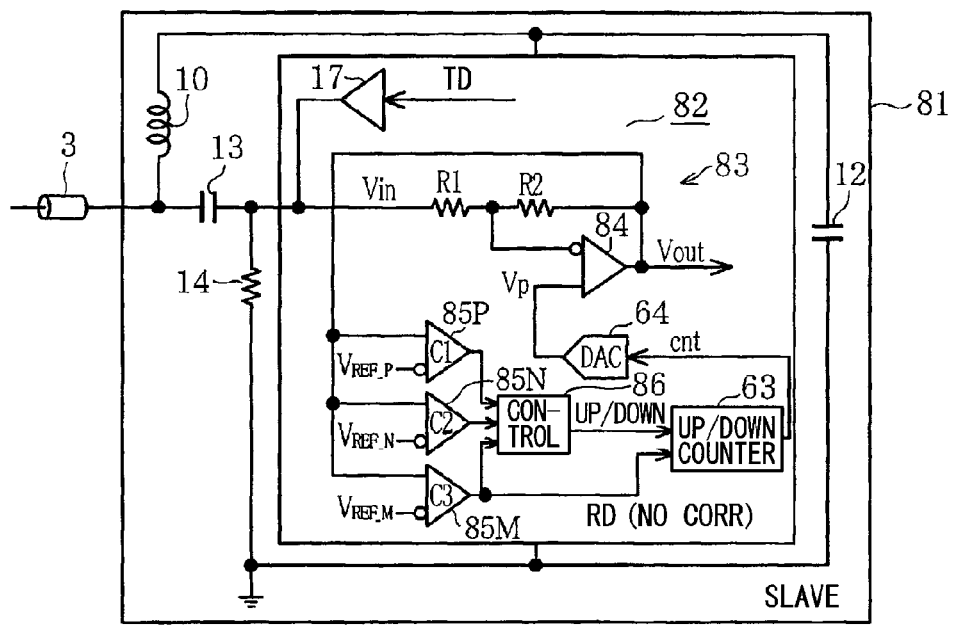
FIG. 15 is a functional block diagram illustrating a configuration of a magnetic saturation circuit in a eighth embodiment.

As described in FIG. 15, a slave 81 in the eighth embodiment includes a magnetic saturation correction circuit 82. The magnetic saturation correction circuit 82 mainly includes an inverting amplifier 83. The inverting amplifier 83 includes an amplifier 84 and a series circuit of resistors R1, R2. A common connection point of the resistors R1, R2 is connected to an inverting input terminal of the amplifier 84. A terminal in the resistor R1 opposite to the resistor R2 is connected to a master-side signal input output terminal. A terminal in the resistor R2 opposite to the resistor R1 is connected to an output terminal of the amplifier 84.

The output terminal of the amplifier 84 is connected to non-inverting input terminals of three comparators 85P, 85N, 85M. The comparator 85P may also be referred to as a first comparator and is illustrated as C1 in FIG. 15. The comparator 85N may also be referred to as a second comparator and is illustrated as C2. The comparator 85M may also be referred to as a third comparator and is illustrated as C3. Inverting input terminals of the comparators 85P, 85N, 85M respectively have reference voltages $V_{REF\_P}$, $V_{REF\_N}$, $V_{REF\_M}$. An up-down controller 86 receives output signals of the comparators 85P, 85N, 85M. The up-down controller 86 is illustrated as "control" in FIG. 15. The up-down controller 86 outputs an up-down control signal to the up-down counter 63 based on each of the output signals.

Figure 16:
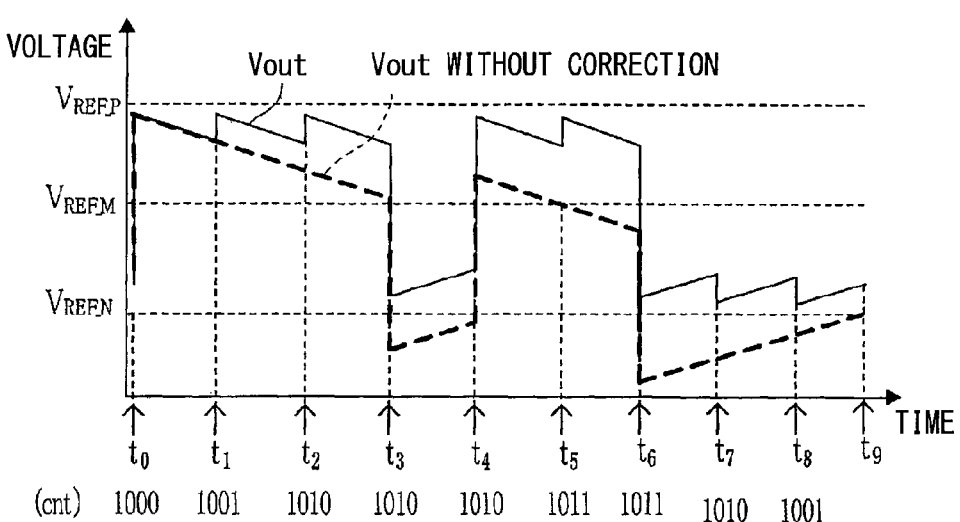
FIG. 16 is a diagram illustrating variations of a counter value and a output voltage of an inversion amplifier circuit in a reception signal waveform and each operation cycle.

As described in FIG. 16, the reference voltage $V_{REF\_P}$ corresponds to a maximum voltage (corresponding to a maximum threshold) of a reception signal amplitude. The reference voltage $V_{REF\_N}$ corresponds to a minimum voltage (corresponding to a minimum threshold and being more than 0 V). The reference voltage $V_{REF\_M}$ corresponds to an intermediate voltage (corresponding to an intermediate threshold). The output signal of the comparator 85M corresponds to a reception data at the time when a correction is not performed. Therefore, the up-down counter 63 receives the output signal similar to the sixth and seventh embodiments. The D/A converter (DAC) 64 receives a count value (cnt) of the up-down counter 63. An analog signal that the D/A converter 64 performs D/A conversion is given to the non-inverting input terminal of the amplifier 84. Incidentally, the count value corresponds to an adjustment signal. As described in FIG. 16, it is assumed that a distortion occurs in a signal waveform by the magnetic saturation and the signal amplitude is between the reference voltages $V_{REF\_P}$ and $V_{REF\_M}$ while the reception signal corresponds to the high level. In this case, the output signal of the comparator 85P corresponds to the low level and the output signal of the comparator 85M corresponds to the high level. In this case, the up-down controller 86 instructs up count with a control signal, so that the up-down counter 63 performs the up count.

Incidentally, when an initial value of the up-down counter 63 is equal to 1000, the D/A converter 64 is set to be 0 V as an output voltage Vp. Symbols t0, t1, t2, or the like in FIG. 16 illustrate operation cycle of the up-down controller 86, the up-down counter 63, and the D/A converter 64. It may be possible to respond to a greater distortion of the waveform as the operation cycle is shorter. In addition, it may be possible to correct more precisely as an output voltage of the D/A converter 64 is more accurate.

The count value of the up-down counter 63 is changed from the initial value 1000 to 1001 and furthermore to 1010. The D/A converter 64 performs a D/A conversion of a count value, which is input, and outputs an analog signal to the non-inverting input terminal of the operational amplifier 84. When an input voltage of the inverting amplifier circuit 83 corresponds to Vin, the output voltage Vout is expressed by the following expression:

$$V\text{out} = V_p/k + V\text{in} \cdot (k-1)/k; \text{ and}$$

$$k = R1/(R1+R2).$$

Therefore, even when the distortion occurs in a waveform of the input voltage Vin, it may be possible to reduce the distortion of the waveform by properly controlling the voltage of the non-inverting input terminal, that is, the output voltage Vp of the D/A converter 64. In this case, the count value of the up-down counter 63 increases each operation cycle, the output voltage Vp increases, and the distortion of the waveform may be reduced as described as a solid line in FIG. 16.

In the operation cycle t3, the up-down controller 86 instructs up count. However, the reception signal is changed to the low level after the operation cycle t3. It may be unfavorable to increase the count value. Thus, the up-down counter 63 detects a change of the reception data input from the comparator 85M and stop performing the up count at the operation cycle t3. Therefore, the count value at the operation cycle t3 continues 1010.

At the next operation cycle t4, the reception signal changes to the high level again, and therefore, the up-down counter 63 continues the count vale of 1010. Therefore, the amount of the correction of the amplitude at the operation cycle t4 is identical with the amount of the correction at the operation cycle t3. The reception signal at an operation cycle t5 corresponds to the high level, and the count value is incremented to be 1011. Subsequently, the signal amplitude at an operation cycle t6 is below the reference voltage $V_{REF\_M}$, and the output signal of the comparator 85M corresponds to the low level. Since the output voltage Vout of the magnetic saturation correction circuit 82 corresponds to the high level by the correction, an occurrence of a communication error is avoided.

The operation cycle t6 corresponds to timing when the signal level is changed from the high level to the low level similar to the operation cycle t3, and therefore, the up-down counter 63 stops performing up count. At the next operation cycle t7, since the signal amplitude is below the reference voltage $V_{REF\_N}$, the all output signals of the comparators 85 correspond to the low level. The up-down controller 86 instructs down count with the control signal, and the up-down counter 63 performs the down count. At this timing, the count value is decremented from 1011 to 1010.

In subsequent cycles, the reception signal at the operation cycle t8 (and t9) corresponds to the low level continuously, and the count value is further decremented to be 1001 at the operation cycle t8. Accordingly, the distortion of the waveform is reduced while the reception signal corresponds to the low level. Incidentally, the waveform during this period is likely to increase gradually.

According to the eighth embodiment, the magnetic saturation correction circuit 82 is configured from the inverting amplifier 83 including the comparators 85P, 85N, 85M, the up-down counter 63, the D/A converter 64, and the operational amplifier 84. The comparators 85P, 85N, 85M respectively compare the reference voltages $V_{REF\_P}$, $V_{REF\_N}$, $V_{REF\_M}$ with a level of the reception signal. The up-down counter 63 performs up/down count according to the output signals. The D/A converter 64 performs a D/A conversion of the count value of the up-down counter 63. The operational amplifier 84 receives voltage, which is D/A converted, at the non-inverting input terminal. The inverting amplifier 83 inversely amplifies the reception signal Vin. Therefore, it may be possible to control the output voltage Vout of the inverting amplifier 83 and to reduce the distortion of the waveform by changing the count value of the up-down counter 63 according to a change of a signal that each comparator 85 outputs corresponding to a variation of the level of the reception signal.

The present disclosure is not limited to the description or the drawings described above. The present disclosure may be modified or expanded.

The DC power source 4 may not be included in the master 1 and instead, the DC power source 4 may be supplied to the communication line 3 separately.

The configurations in the fourth embodiment to the eighth embodiment may be applied to a differential type communication line as described in the second embodiment or to a unidirectional communication line as described in the third embodiment.

According to a communication system in one aspect of the present disclosure, a signal distortion correction circuit included in each communication node detects the amount of distortion of a signal waveform based on the magnetic saturation phenomenon in a communication line and corrects the distortion of the signal waveform according to the amount of the distortion. That is, when a master and multiple slaves are cascade connected, an inductance in an inductor may affect on current flowing in the communication line and a magnetic saturation phenomenon may occur. When the magnetic saturation phenomenon occurs, a distortion may occur in a communication signal waveform and a communication error may occur. According to one aspect of the present disclosure, since the distortion of the signal waveform is dynamically corrected according to the amount of the distortion of the signal waveform based on the magnetic saturation phenomenon that has occurred when a communication is performed actually, it may be possible to avoid an occurrence of the communication error.

According to a communication slave disclosed in one aspect of the present disclosure, the communication slave is connected to the communication line, which is also used as a feeder line, through an inductor and is supplied with electricity. The communication slave is AC coupled to the communication line and receives a communication signal transmitted from a master or a slave. The communication slave transmits the communication signal to the master through the communication line. Therefore, similar to the slave in the communication system, since the communication slave enables to perform a bidirectional communication with the master through the communication line, it may be possible to configure a communication system by applying a network topology in which a master and multiple slaves are cascade connected. According to the communication slave in one aspect of the present disclosure, it may be possible to avoid an occurrence of the communication error.

According to a communication master disclosed in another aspect of the present disclosure, since the communication master includes a signal distortion correction circuit at an input side of a receiver that receives a signal transmitted from a slave, it may be possible to prevent a communication error from occurring.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A communication system comprising:
    a plurality of communication nodes including a master and a plurality of slaves; and
    a communication line cascade-connecting the communication nodes and supplying electricity, the communication line corresponding to a feeder line, wherein
    each of the communication nodes is connected with the communication line through an inductor and is supplied with electricity,
    the each of the communication nodes is AC coupled to the communication line to transmit and receive a communication signal,
    the master and the slaves perform a bidirectional communication,
    each of the communication nodes includes
        a receiver receiving the communication signal transmitted from another communication node, and
        a signal distortion correction circuit at an input side of the receiver,
    the signal distortion correction circuit detects an amount of distortion of a signal waveform generated by a magnetic saturation phenomenon in the communication line, and
    the signal distortion correction circuit corrects the distortion of the signal waveform according to the amount of the distortion, and
    the signal distortion correction circuit includes
        an A/D converter performing an A/D conversion of a reception signal,
        a comparator comparing an A/D converted data and a threshold data and outputting a binary data as an output data according to a comparison result of the A/D converted data and the threshold data,
        a subtractor calculating a difference between the A/D converted data and the output data, and
        a correction circuit correcting an output data of the A/D converter according to the difference.

2. A communication system comprising:
    a plurality of communication nodes including a master and a plurality of slaves; and
    a communication line cascade-connecting the communication nodes and supplying electricity, the communication line corresponding to a feeder line, wherein
    each of the communication nodes is connected with the communication line through an inductor and is supplied with electricity,
    the each of the communication nodes is AC coupled to the communication line to transmit and receive a communication signal,
    the master and the slaves perform a bidirectional communication,
    each of the communication nodes includes
        a receiver receiving the communication signal transmitted from another communication node; and
        a signal distortion correction circuit at an input side of the receiver,
    the signal distortion correction circuit detects an amount of distortion of a signal waveform generated by a magnetic saturation phenomenon in the communication line, and
    the signal distortion correction circuit corrects the distortion of the signal waveform according to the amount of the distortion, and
    the signal distortion correction circuit includes
        an increase-and-decrease determination portion determining an increase and decrease state of a signal amplitude in one bit period of a reception signal,
        a low pass filter whose time constant is changeable, and
        an adjustment signal output portion generating and outputting an adjustment signal, which changes the time constant of the low pass filter according to the increase and decrease state, to the low pass filter.

3. The communication system according to claim 2, wherein
the increase-and-decrease determination portion includes
a sample hold circuit sampling sample values of the signal amplitude within the one bit period twice and storing the sample values, and
a comparator comparing a magnitude relationship of the sample values and outputting a determination signal of the increase and decrease state.

4. The communication system according to claim 2, wherein
the adjustment signal output portion includes
an up-down counter performing up count or down count according to a determination result of the increase and decrease state, and
a D/A converter performing a D/A conversion of a count value of the up-down counter and outputting the adjustment signal to the low pass filter.

5. The communication system according to claim 2, wherein
the low pass filter includes a capacitor and a resistance variation portion, and
a resistance of the resistance variation portion changes according to the adjustment signal.

6. The communication system according to claim 2, wherein
the low pass filter includes a switched capacitor filter,
the adjustment signal output portion includes an oscillation circuit, and
the oscillation circuit changes a frequency of a clock signal switching the switched capacitor filter according to a determination result of the increase and decrease state.

7. A communication system comprising:
a plurality of communication nodes including a master and a plurality of slaves; and
a communication line cascade-connecting the communication nodes and supplying electricity, the communication line corresponding to a feeder line, wherein
each of the communication nodes is connected with the communication line through an inductor and is supplied with electricity,
the each of the communication nodes is AC coupled to the communication line to transmit and receive a communication signal,
the master and the slaves perform a bidirectional communication,
each of the communication nodes includes
a receiver receiving the communication signal transmitted from another communication node, and
a signal distortion correction circuit at an input side of the receiver,
the signal distortion correction circuit detects an amount of distortion of a signal waveform generated by a magnetic saturation phenomenon in the communication line,
the signal distortion correction circuit corrects the distortion of the signal waveform according to the amount of the distortion,
the signal distortion correction circuit includes an inverting amplifier,
the inverting amplifier includes:
a first comparator comparing a level of a reception signal with a maximum threshold;
a second comparator comparing the level of the reception signal with a minimum threshold;
a third comparator comparing the level of the reception signal with an intermediate threshold that is set between the maximum threshold and the minimum threshold;
an up-down counter performing up count or down count according to output signals of the first comparator, the second comparator, and the third comparator;
a D/A converter performing a D/A conversion of a count value of the up-down counter and outputting an adjustment signal; and
an operational amplifier receiving the adjustment signal, which is outputted from the D/A converter, from a non-inverting input terminal of the operation amplifier, and
the inverting amplifier inversely amplifies the reception signal.

8. A communication slave comprising:
a receiver receiving a signal transmitted from another communication node; and
a signal distortion correction circuit at an input side of the receiver,
wherein
the communication slave is connected with a communication line through an inductor and is supplied with electricity, the communication line corresponding to a feeder line,
the communication slave is AC coupled to the communication line to receive a communication signal transmitted from a master,
the communication slave transmits the communication signal to the master through the communication line,
the signal distortion correction circuit detects an amount of distortion of a signal waveform generated by a magnetic saturation phenomenon in the communication line,
the signal distortion correction circuit corrects the distortion of the signal waveform according to the amount of the distortion, and
the signal distortion correction circuit includes
an A/D converter performing an A/D conversion of a reception signal,
a comparator comparing an A/D converted data and a threshold data and outputting a binary data as an output data according to a comparison result of the A/D converted data and the threshold data,
a subtractor calculating a difference between the A/D converted data and the output data, and
a correction circuit correcting an output data of the A/D converter according to the difference.

9. A communication master, wherein
a power source is connected with a communication line through an inductor and supplies a slave with electricity, the communication line corresponding to a feeder line,
the communication master is AC coupled to the communication line to transmit and receive a communication signal with the slave,
the communication master includes a receiver receiving a signal transmitted from the slave,
the communication master includes a signal distortion correction circuit at an input side of the receiver,
the signal distortion correction circuit detects an amount of distortion of a signal waveform generated by a magnetic saturation phenomenon in the communication line,
the signal distortion correction circuit corrects the distortion of the signal waveform according to the amount of the distortion, and
the signal distortion correction circuit includes an A/D converter performing an A/D conversion of a reception signal, a comparator comparing an A/D converted data and a threshold data and outputting a binary data as an output data according to a comparison result of the A/D converted data and the threshold data, a subtractor calculating a difference between the A/D converted data and the output data, and a correction circuit correcting an output data of the A/D converter according to the difference.

\* \* \* \* \*